United States Patent
McCurdy, Jr. et al.

(10) Patent No.: US 6,883,874 B2
(45) Date of Patent: Apr. 26, 2005

(54) PRESSURE SENSOR MODULE

(75) Inventors: William B. McCurdy, Jr., Watertown, NY (US); Gary S. Newton, Adams, NY (US); Ronald O. Newton, Adams, NY (US); Steven R. Newton, Adams, NY (US); Gary Lynn Miller, Rockford, IL (US)

(73) Assignees: New York Air Brake Corporation, Watertown, NY (US); Honeywell International Inc., Morristown, NJ (US)

(*) Notice: Subject to any disclaimer, the term of this patent is extended or adjusted under 35 U.S.C. 154(b) by 0 days.

(21) Appl. No.: 10/067,816

(22) Filed: Feb. 8, 2002

(65) Prior Publication Data

US 2003/0047991 A1 Mar. 13, 2003
US 2004/0262987 A9 Mar. 13, 2003

Related U.S. Application Data

(63) Continuation of application No. 09/947,526, filed on Sep. 7, 2001.

(51) Int. Cl.[7] ............................................. B60T 13/00
(52) U.S. Cl. ................. 303/7; 303/15; 303/20
(58) Field of Search ..................... 303/3, 5, 15, 20, 303/7, DIG. 10, DIG. 11; 24/458, 543; 439/76.1, 76.2, 672; 336/192; 335/202; 174/50.5, 50; 411/368

(56) References Cited

U.S. PATENT DOCUMENTS

| | | |
|---|---|---|
| 2,989,106 A | 6/1961 | Smiley |
| 4,656,454 A | 4/1987 | Rosenberger |
| 4,898,360 A | 2/1990 | VonHayn et al. |
| 5,184,107 A | 2/1993 | Maurer |
| 5,187,621 A * | 2/1993 | Tacklind .................... 174/50 |
| 5,257,547 A | 11/1993 | Boyer |
| 5,301,717 A | 4/1994 | Goedecke |
| 5,317,462 A * | 5/1994 | Kakizaki et al. ........... 174/52.3 |
| 5,327,785 A | 7/1994 | Maurer |
| 5,412,994 A | 5/1995 | Cook et al. |
| 5,482,362 A * | 1/1996 | Robinson ................. 303/119.2 |
| 5,546,250 A * | 8/1996 | Diel ....................... 360/97.02 |
| 5,746,561 A * | 5/1998 | Nygren et al. .............. 411/368 |
| 5,866,822 A | 2/1999 | Willig |
| 5,967,465 A | 10/1999 | Lumbis et al. |
| 5,967,620 A | 10/1999 | Truglio et al. |
| 6,036,284 A | 3/2000 | Pettit et al. |
| 6,086,163 A * | 7/2000 | Klink et al. .................... 303/7 |
| 6,098,006 A | 8/2000 | Sherwood et al. |
| 6,135,574 A | 10/2000 | Pettit et al. |

(Continued)

FOREIGN PATENT DOCUMENTS

| | | |
|---|---|---|
| EP | 0 721 156 A1 | 7/1996 |
| EP | 0 829 402 A2 | 3/1998 |
| EP | 0 849 752 A1 | 6/1998 |
| EP | 0 721 156 B1 | 10/1999 |
| EP | 1 029 760 A2 | 8/2000 |
| EP | 0 849 752 B1 | 7/2001 |
| WO | 99/50115 A1 | 10/1999 |
| WO | 00/30909 A1 | 6/2000 |

OTHER PUBLICATIONS

Honeywell Micro Switch Sensing and Control, "Environmental Condition Sensors" Catalog 15, Sep. 1998, pp. 31–35, 112–118, Freeport, Illinois.

*Primary Examiner*—Robert A. Siconolfi
(74) *Attorney, Agent, or Firm*—Barnes & Thornburg LLP

(57) ABSTRACT

A pressure sensor module for use in conjunction with an electropneumatic brake, comprising a casing and a plurality of pneumatic input ports on a first face of the casing. Transducers are inside the casing and in communication with its own port. A common electrical connector is positioned on a second face of the casing, and each of the transducers is connected, interior the casing, to the common electrical connector.

12 Claims, 4 Drawing Sheets

U.S. PATENT DOCUMENTS

| | | |
|---|---|---|
| 6,142,580 A | 11/2000 | Sinn et al. |
| 6,250,724 B1 * | 6/2001 | Shimizu et al. .......... 303/119.2 |
| 6,312,061 B1 | 11/2001 | Schliebe et al. |
| 6,347,845 B1 | 2/2002 | Engfer et al. |
| 6,354,674 B1 * | 3/2002 | Iwamoto et al. ......... 303/119.3 |
| 6,375,277 B1 | 4/2002 | Carroll |
| 6,382,738 B1 | 5/2002 | Bayer et al. |
| 6,472,769 B1 | 10/2002 | Long, Jr. et al. |

* cited by examiner

PRESSURE SENSOR MODULE

CROSS REFERENCE

This is a continuation of U.S. patent application Ser. No. 09/947,526 filed Sep. 7, 2001, still pending.

BACKGROUND AND SUMMARY OF THE INVENTION

The present invention relates generally to a pressure sensor device to be incorporated into a car control device of an electropneumatic brake for use in a train and more specifically, to improvements in the pressure sensor module.

In general, a train is comprised of a consist of one or more locomotives followed by a series of cars, and a pneumatic brake pipe extending through the train for the pneumatic brake. In recent years, each of the train cars and each of the locomotives have been serially connected by a power and communication trainline. Additionally, each car has an electropneumatic brake system. The serial electric power network and the pneumatic brake network have been integrated to form an electropneumatic braking system which is in communication with the power and communication trainline, which not only delivers power to each of the cars but also provides a communication link, enabling identification and serialization of a train.

In order to integrate the pneumatic and electrical systems in a network, the prior art devised a car control device for placement in each car, and the car control device was then placed in contact with an ID module and the power and communication trainline. An example of a system is shown in U.S. Pat. No. 5,967,465 to Lumbis et al and a car control device is disclosed in U.S. Pat. No. 5,967,620 to Truglio et. al.

A car control device necessarily involves the linking and intertwining of several systems. The car control device is comprised of a pressure sensing system, a control valve system, a power management system, a functional control system, and a manifold. The control valve system is comprised of a plurality of valves which may be electrically controlled in response to electrical signals received from the functional control module to pneumatically control the pneumatic brakes. A plurality of pressure transducers comprising a pressure sensor module communicates with the functional control system. Therefore, a car control device involves an intricate network of systems in fluid and/or electrical communication with one another.

A pressure sensor module (PSM) is an integral part of a car control device. The PSM must be in fluid communication with the manifold in order to detect and determine the pressure at various points in a manifold within the car control device, and the PSM must also be in electrical communication with the functional control module, which provides braking and communication signals, based on information received from the PSM, to the network. Preferably, the pressure sensor module is mounted inside the housing adjacent to the control valve module and the power management module.

The pressure sensor module comprises a casing and a plurality of pneumatic input ports integrally configured on a first face of the casing and to be in fluid communication with the manifold. The ports are configured so that mounting of the module of the pressure sensor module to the manifold sealably connects each of the pneumatic input ports to an aperture in fluid communication with the manifold. Preferably, the casing is sealed except for the ports. A plurality of transducers are inside the casing and in communication with its own port. Each of the transducers is electrically connected to the functional control module.

The pneumatic input ports of the pressure sensor module are connected respectively to receive fluid communication from ports on the manifold which correspond to an emergency reservoir, a brake pipe, a brake cylinder, control valve, and the external atmosphere. The pressure sensed at each of the emergency reservoir, brake pipe, brake cylinder and control valve pressure ports is compared to the atmospheric reference, then translated into a voltage by the respective pressure transducers, thereby producing a signal from the transducers that is proportional to a gauge pressure for each of the respective ports. The casing comprises at least one bore for receipt of a fastener which attaches the casing to the manifold.

The pressure sensor module has a multi-pin electrical receptacle on a second face of the casing. The receptacle is configured such that each of the transducers has an output electrically connected to a respective pin. Additionally, a pair of pins of the receptacle correspond to a pair of common voltage inputs to each of the transducers. A cable is mated with the receptacle in order to transmit these signals to the functional control module of the car control device and provide voltage to the pressure sensor module.

The pressure sensor module further comprises an ambient input port in fluid communication with the external atmosphere. The ambient input port is connected to a conduit that extends through the housing to provide direct fluid communication with atmospheric pressure.

DETAILED DESCRIPTION OF THE PREFERRED EMBODIMENTS

Figure 1:
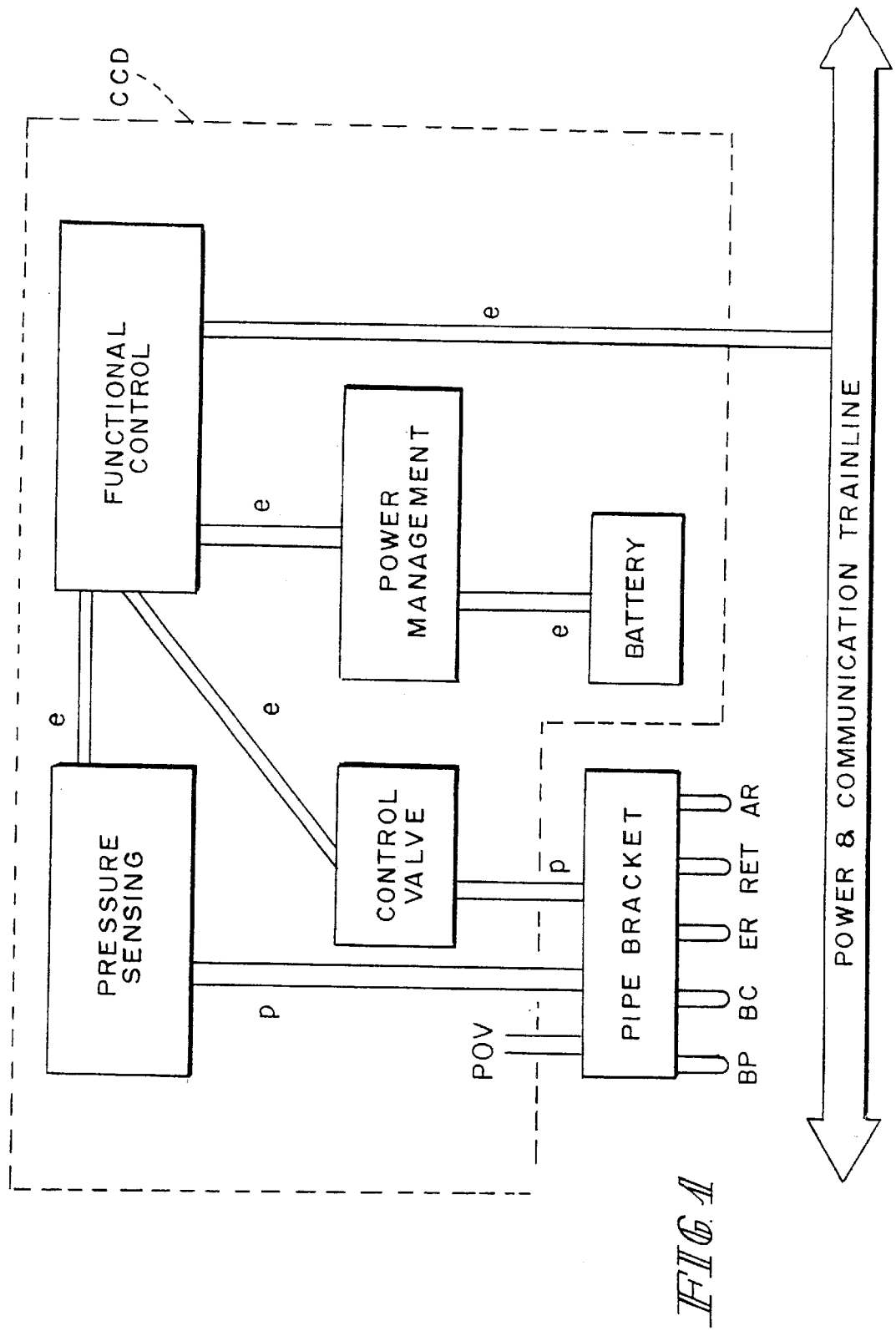
FIG. 1 is a schematic of a car control device.

In order to fully understand how the pressure sensor module integrates into the makeup of a car control device, FIG. 1 is provided to show the general schematic makeup for the various systems involved in the construction of a car control device. A power and communication trainline connects each car of a train. On each car is a car control device comprising various cooperating systems. A pipe bracket connects the car control device CCD to the pneumatic brake system. The pneumatic inputs are brake pipe BP, brake cylinder BC, emergency reservoir ER, retaining valve RET and auxiliary reservoir AR. A control valve system as well as a pressure sensor system is configured to mate with various pneumatic ports to supply pneumatic signals to a control valve system as well as a pressure sensor system by a manifold.

Figure 2:
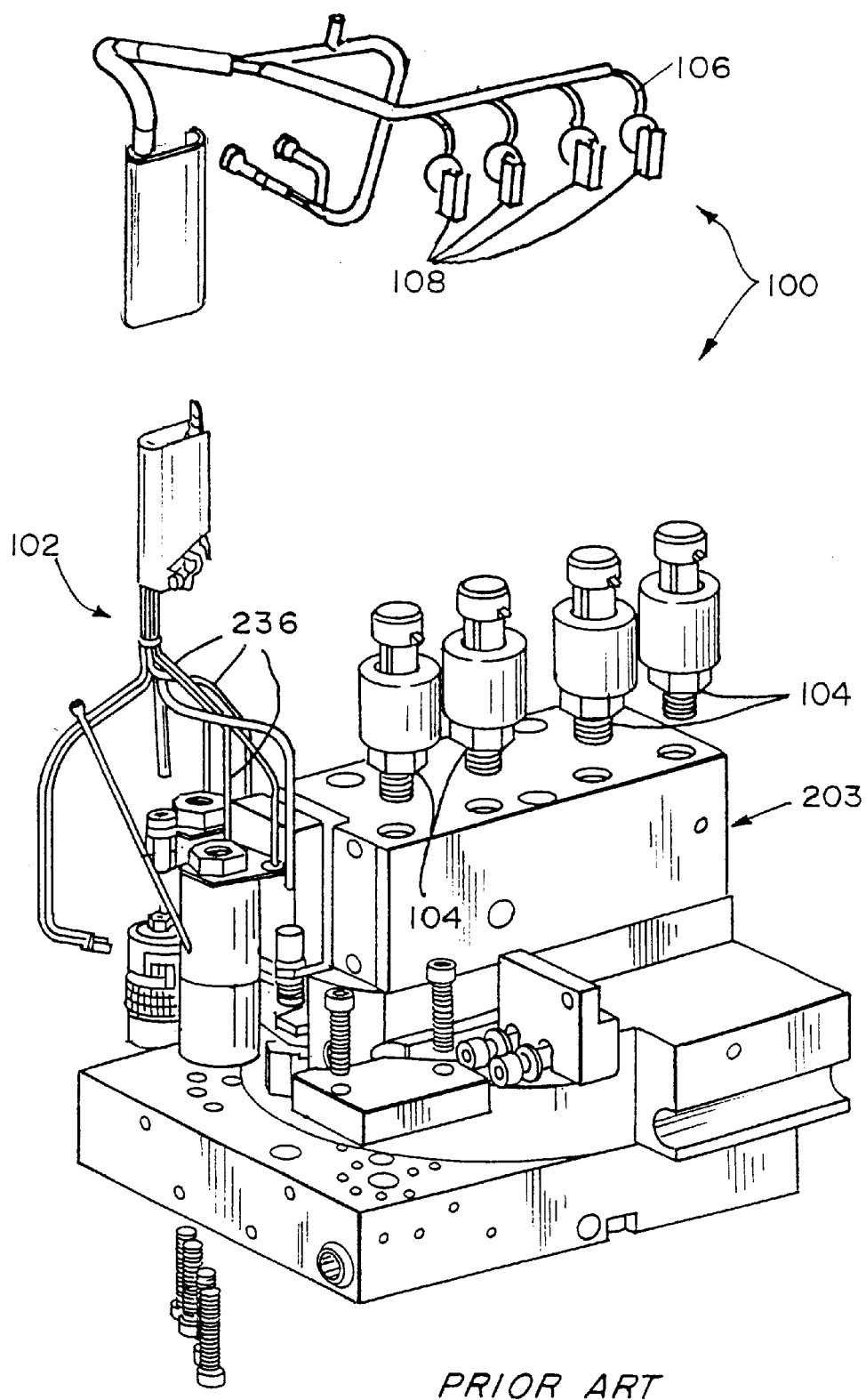
FIG. 2 is an exploded view of a portion of a car control device of the prior art.

An example of a pressure sensing system of the prior art is shown in FIG. 2. FIG. 2 shows the pressure sensing system 100 mounted on the same assembly as the control valve system 102. The prior art used four separate transducers 104 individually mounted at the CVT port, ERT port, BPT port, and the BCT port, as shown. Each transducer was wired separately. The wiring 106 for the pressure sensing system 100 of the prior art involved four three pin connectors 108 that each included two common connections, namely a positive supply and negative supply signal connection. Therefore, the prior art required at least twelve discreet wires to be connected to the controlling circuits. Additionally, each transducer 104 required an atomospheric reference so that gauge pressure values could be determined. This arrangement required a vented enclosure for the transducer, exposing the transducer and other components within the housing to moisture, dirt and other contaminants that may be in the air.

Figure 3:
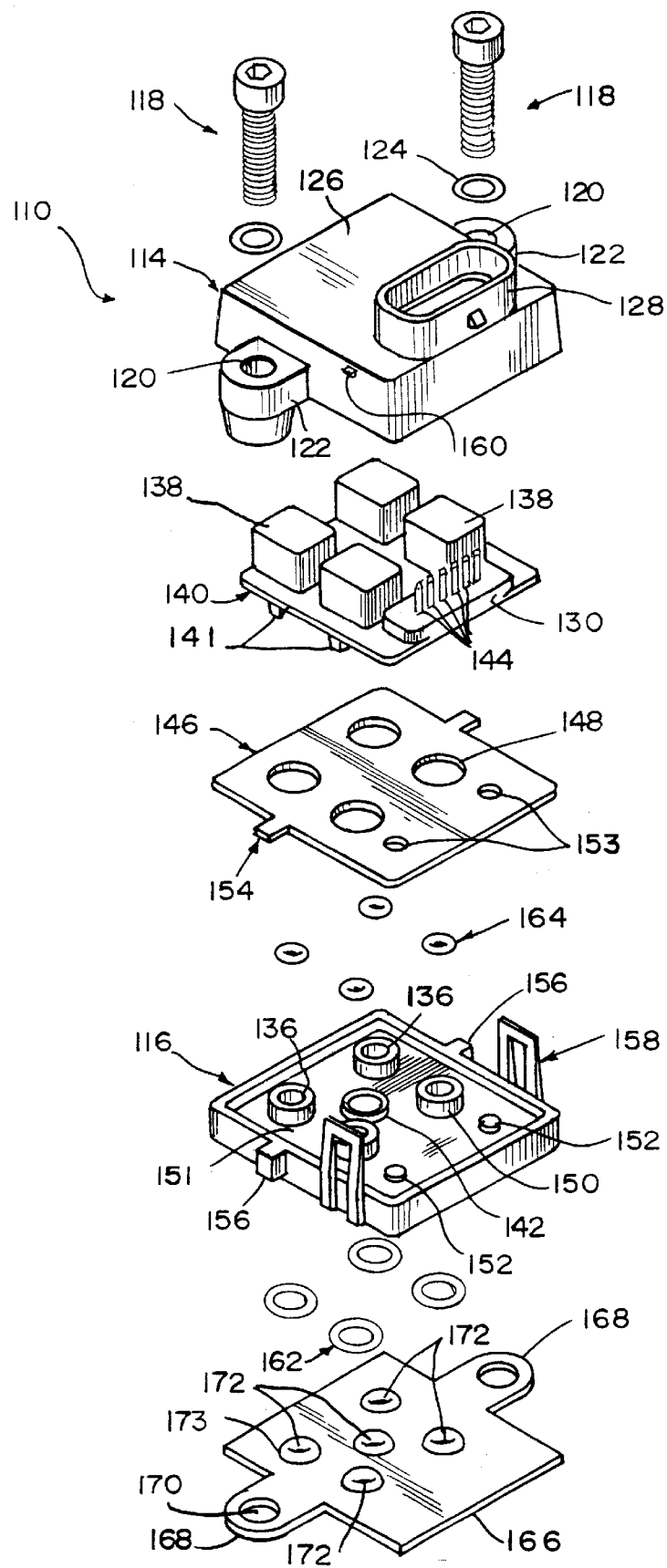
FIG. 3 is an exploded view of a pressure sensor module according to the principles of the present invention.
Figure 4:
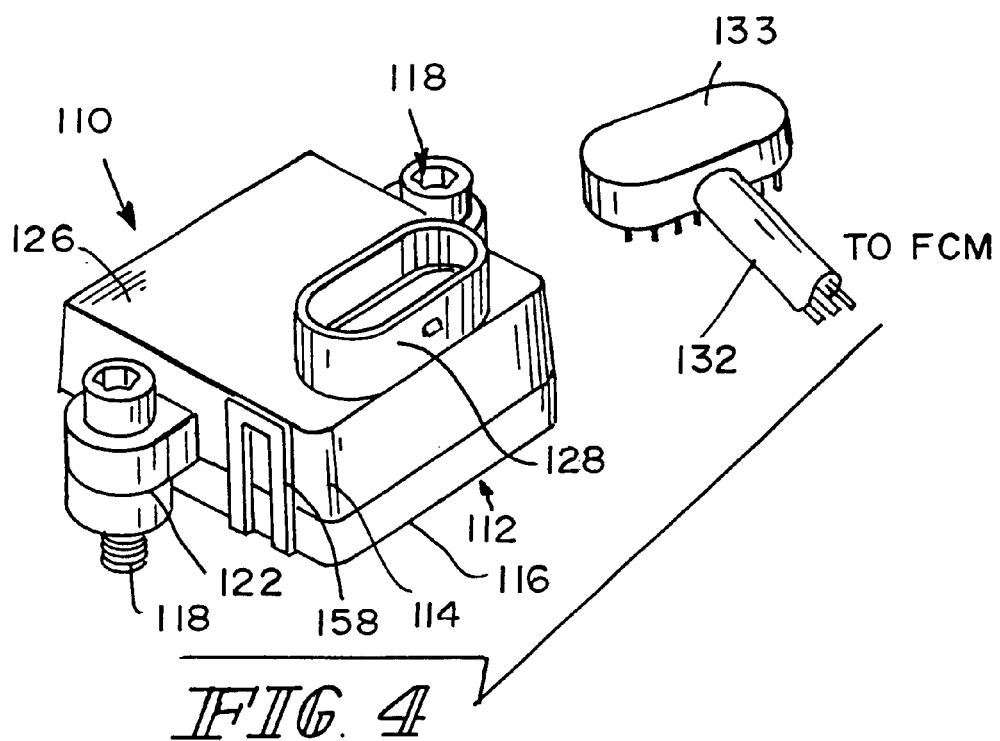
FIG. 4 is an assembled view of the pressure sensor module according to the principles of the present invention.
Figure 5:
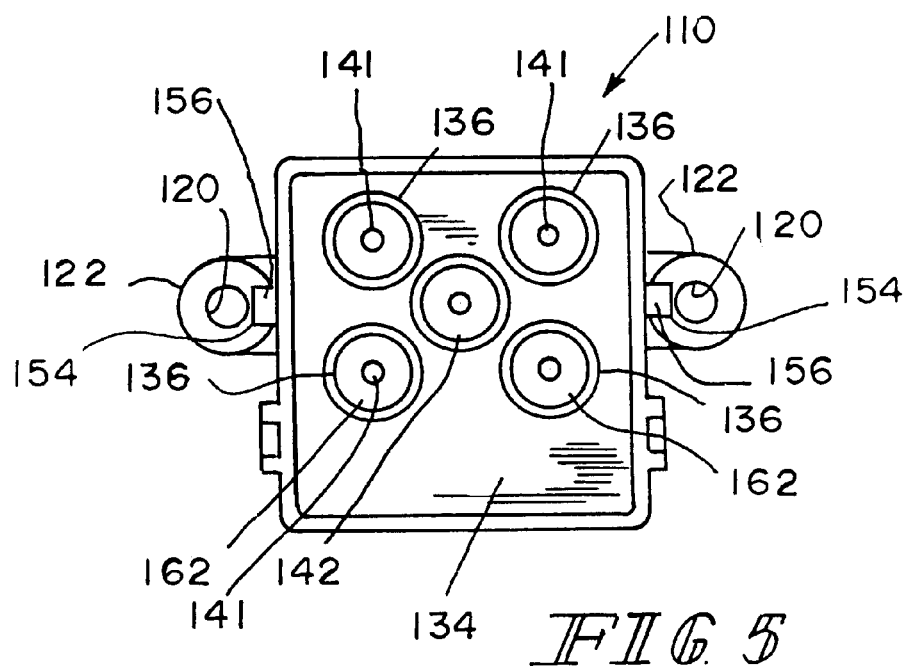
FIG. 5 is a bottom view of FIG. 4.

According to the present invention as shown in FIGS. 3–5, pressure sensor module 110 comprises casing 112 comprised of an upper casing 114 and a lower casing 116, which is securably mounted to the car control device (not shown) by fasteners 118. Because the pressure sensor module 110 is preferably mounted in an interior area of a car control device (not shown), a wrench clearance is an issue. In order to address the wrench clearance issue, the fasteners 118 are preferably a hex head Allen screws. The Allen screw configuration enables mounting and dismounting using a simple Allen wrench. In the shown embodiment, fasteners 118 extend through apertures 120 that are formed in ears 122 attached to the upper casing 114. Additionally, washers 124 may be positioned between the fasteners 118 and the ears 122. In order to prevent loss, the fasteners 118 may be retained within the apertures 120 by retaining fingers 154 which outwardly extend from gasket 146 to frictionally engage the fastener 118.

One face of the pressure sensor module 110, preferably a top face 126, has a receptacle 128 formed thereon. The receptacle 128 is formed to protect electrical connector 130, which electrically connects with and mates with an electrical cable 132 by means of a mating plug 133 as shown in FIG. 4. Electrical cable 132 extends from receptacle 128 and connector 130 to the functional control module (not shown) of the car control device (not shown).

FIG. 5 shows the bottom face of the pressure sensor module 110. The bottom face has a plurality of pressure transducer ports 136. Each port 136 is connected to a pressure transducer 138 sealed in the casing 112. The transducers 138 are electrically connected to the connector 130 by a printed circuit board 140. The pressure transducers 138 detect and measure the pressure at various points in the manifold, these points corresponding to respective pressures in the brake pipe BP, emergency reservoir, brake cylinder, and the output of the control valve. The bottom face 134 of the pressure sensor module 110 further comprises an atmosphere port 142, which provides a common pressure reference to each of the transducers 138 in order to derive a voltage signal proportional to the gauge pressure sensed in each of the respective conduits of the manifold, because the casing 112 is sealed onto the manifold (not shown).

The transducers 138 are each respectively electrically connected to conduit 141 depending from the printed circuit board 140. Preferably, the conduits 141 are integrally configured onto the circuitry of the printed circuit board 140. These conduits 141 and the lower casing 116 are cooperatively configured so that the ports 136 align with the conduits 141.

It is important to determine gauge pressure because a locomotive will likely travel to various altitudes, where the atmospheric pressure may vary significantly. The atmosphere port 142 must be connected to the atmosphere; it can be conveniently placed on any face. As shown in FIG. 5, however, the atmosphere port 142 is in the bottom face 134 of the housing 112.

The inventive pressure sensor module is a significant improvement over the prior art pressure sensing assembly shown in FIG. 2. First, the space requirement is significantly reduced because each of the transducers determines gauge pressure with respect to a common atmospheric vent. In the prior art, each of the transducers required a separate atmospheric reference. The prior art required a 12 pin connector in order to properly connect the four transducers. The configuration of the instant invention simplifies the electronics and may be done with a six-pin connector.

Wiring of the pressure sensor module is simplified as well. Shown in FIG. 3 is a six pin connector 130 configured within the receptacle 132. Four of the pins 144 carry the signal from each of the four transducers 138, and two of the pins 144 are a common plus and minus power source for each of the transducers. All of the electrical connections to the transducers 138 is inside the casing 112. This presents a significant improvement over the prior art, which required twelve discreet wires, as aforementioned. Pin connector 130 is mounted on the printed circuit board 140 with the transducers 138 so that no wires are required therebetween.

A gasket 146 is positioned within the casing 112. The gasket 146 will have holes 148 configured to allow passageway from a respective port 136 to the transducers 138. The ports 136 may each include a raised wall 150 formed on an inner face 151 of lower casing 116. Additionally, the inner face may have raised pins 152 adjacent a single opening (not shown) or a plurality of openings 153 in the gasket 146. The pins 152 and the raised wall of atmosphere port 142 are shorter than the raised walls 150. Thus, the interior of the casing 112 is at atmosphere above and below gasket 146. The raised walls 150 cooperate to hold gasket 146.

Additionally, the gasket 146 may include a retaining finger 154. When the casing 112 is closed, as shown in FIG. 4, the retaining finger 154 of gasket 146 is wedged between protuberance 156 of the lower casing 116 and the ear 122 of the upper casing, which further assists in keeping the gasket 146 in place. The retaining fingers 154 of gasket 146 extend past the protuberance 156 and across the aperture 120 in ear 122.

The lower casing 116 includes a latch 158 designed to engage a catch 160 on the upper casing 114 in order to keep the casing 112 closed.

External interface o-rings 162 may be positioned on the bottom face 134 around each of the ports 136 in order to assist in creating an airtight seal between the pressure sensing module 110 and the car control device (not shown). In like manner, internal o-rings 164 may be positioned on inner face 151 of the lower casing 116 and within raised walls 150 of ports 136 in order to assist in creating an airtight chamber within the pressure sensing module 110 about the conduits 141.

As an alternative to individual o-rings 162, an external one-piece gasket 166 may be positioned on a bottom face 134 of the casing 112. The external one-piece gasket 166 will bear a plurality of openings 172 configured to allow access to the pneumatic input ports 136 and the atmosphere port 142. The openings 172 will be surrounded by rims 173. The external one-piece gasket 166 has ears 168 cooperatively configured with the ears 122 on the upper casing 114. The ears 168 on external one-piece gasket 166 are configured to allow fasteners 118 to pass through aperture 170 which may be of a smaller diameter than apertures 120 and further retain the fastener 118 on the casing 112.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A pressure sensor module separate from and for use in conjunction with an electropneumatic brake, the pressure sensor module comprising:
   a casing having an upper casing and a lower casing cooperatively formed to mate with one another to form a generally sealed interior chamber there between;
   at least one ear extending from a lateral edge of the casing, the at least one ear including an aperture formed therein to receive a fastener in order to fasten the pressure sensor module onto a manifold;
   a retainer adjacent the ear and extending over part of the aperture to retain the fastener in the aperture prior to fastening the pressure sensor module to the manifold;
   a plurality of pneumatic input ports on a first face of the casing;
   a plurality of transducers inside the casing and in communication with its own port;
   a common electrical connector on a second face of the casing; and,
   each of the transducers being connected, interior the casing, to the common electrical connector.

2. The pressure sensor module as in claim 1, further comprising a gasket positioned between the fastener and the aperture.

3. The pressure sensor module as in claim 1, further comprising a latch on one of the upper or lower housing, and a catch on another of the upper or lower housing, the latch and the catch cooperatively configured to engage one another and hold the upper and lower casings together.

4. The pressure sensor module as in claim 1, further comprising a raised wall positioned at each respective pneumatic input port, each raised wall extending from an inner surface of the lower casing.

5. A pressure sensor module separate from and for use in conjunction with an electropneumatic brake, the pressure sensor module comprising:
   a casing having an upper casing and a lower casing cooperatively formed to mate with one another to form a generally sealed interior chamber there between;
   at least one ear extending from a lateral edge of the casing, the at least one ear including an aperture formed therein to receive a fastener in order to fasten the pressure sensor module onto a manifold;
   a gasket in the casing and including fingers extending from the casing over the ears and part of the aperture forming a retainer to retain the fastener in the aperture prior to fastening the pressure sensor module to the manifold;
   a plurality of pneumatic input ports on a first face of the casing;
   a plurality of transducers inside the casing and in communication with its own port;
   a common electrical connector on a second face of the casing; and,
   each of the transducers being connected, interior the casing, to the common electrical connector.

6. The pressure sensor module as in claim 5, wherein the retained fastener is an Allen screw.

7. A pressure sensor module separate from and for use in conjunction with an electropneumatic brake, the pressure sensor module comprising:
   a sealed casing;
   a printed circuit board positioned within the casing;
   a gasket positioned between the casing and the printed circuit board;
   a plurality of pneumatic input ports on a first face of the casing;
   raised walls extending inwardly from each of the pneumatic input ports in the casing and the gasket having holes formed to receive the raised walls, which retain the gasket in place;
   a plurality of transducers mounted on the printed circuit board inside the casing and in communication with its own port;
   a common electrical connector on a second face of the casing; and,
   each of the transducers being connected, interior the casing, to the common electrical connector.

8. The pressure sensor module as in claim 7, wherein the transducers are in electric communication with the electric connector mounted on the printed circuit board.

9. The pressure sensor module as in claim 7, further comprising a plurality of internal o-rings, each internal o-ring positioned adjacent a respective pneumatic input port on an face of the lower housing.

10. The pressure sensor module as in claim 7, wherein the casing includes a lower casing and an upper casing;
    the lower casing having a protuberance protruding outwardly from a lateral edge of the lower casing; and
    the gasket includes a retaining finger cooperatively configured with the protuberance, such that as the casings are closed, the protuberance and the retaining finger will align with one another, thereby wedging the retaining finger between the protuberance on the lower casing and an ear extending from the upper casing.

11. The pressure sensor module as in claim 10, wherein the retaining finger extends into the aperture within the ears to engage a fastener passing there though thereby retaining the fastener in the aperture.

12. The pressure sensor module as in claim 7, including a plurality of pins extending inwardly adjacent the raised walls and the pins being shorter than the raised walls and for supporting the gasket.

* * * * *

UNITED STATES PATENT AND TRADEMARK OFFICE
CERTIFICATE OF CORRECTION

PATENT NO. : 6,883,874 B2
APPLICATION NO. : 10/067816
DATED : April 26, 2005
INVENTOR(S) : William B. McCurdy, Jr. et al.

It is certified that error appears in the above-identified patent and that said Letters Patent is hereby corrected as shown below:

Column 5 - Line 28, line 2, delete "gasket" and insert --washer--.

Signed and Sealed this

Fifteenth Day of August, 2006

JON W. DUDAS
*Director of the United States Patent and Trademark Office*